(12) United States Patent
Chiesura

(10) Patent No.: US 12,181,009 B2
(45) Date of Patent: *Dec. 31, 2024

(54) BRAKING BAND OF A DISC FOR DISC BRAKE OF VENTILATED TYPE

(71) Applicant: BREMBO S.p.A., Curno (IT)

(72) Inventor: Elisabetta Chiesura, Curno (IT)

(73) Assignee: Brembo S.p.A., Bergamo (IT)

( * ) Notice: Subject to any disclaimer, the term of this patent is extended or adjusted under 35 U.S.C. 154(b) by 367 days.

This patent is subject to a terminal disclaimer.

(21) Appl. No.: 17/632,821

(22) PCT Filed: Jul. 22, 2020

(86) PCT No.: PCT/IB2020/056870
§ 371 (c)(1),
(2) Date: Feb. 4, 2022

(87) PCT Pub. No.: WO2021/024073
PCT Pub. Date: Feb. 11, 2021

(65) Prior Publication Data
US 2022/0275843 A1 Sep. 1, 2022

(30) Foreign Application Priority Data
Aug. 5, 2019 (IT) .................. 102019000013929

(51) Int. Cl.
*F16D 65/12* (2006.01)
*F16D 65/02* (2006.01)
(52) U.S. Cl.
CPC ...... *F16D 65/128* (2013.01); *F16D 2065/132* (2013.01); *F16D 2065/1328* (2013.01)
(58) Field of Classification Search
CPC ........... F16D 65/12; F16D 65/123–128; F16D 2065/1328; F16D 2065/1344
(Continued)

(56) References Cited

U.S. PATENT DOCUMENTS 3,983,973 A 10/1976 Zboralski et al.
4,523,666 A 6/1985 Murray
(Continued)

FOREIGN PATENT DOCUMENTS

CN 207005150 U 2/2018
CN 109578473 A 4/2019
(Continued)

OTHER PUBLICATIONS

European Patent Office, International Search Report, issued in PCT/IB2020/056870, Nov. 6, 2020, Rijswijk, NL.

*Primary Examiner* — Christopher P Schwartz
(74) *Attorney, Agent, or Firm* — Marshall & Melhorn, LLC

(57) ABSTRACT

A braking band of a disc brake disc has two mutually facing plates having inner surfaces, either directly or indirectly facing and delimiting a gap, outer surfaces having flat and opposite circumferential portions which form braking surfaces and plate bodies having a predetermined plate thickness. The plates are joined to each other by connecting elements shaped as columns or ribs which project from one plate towards an opposite plate in the form of bridges which connect the plates. One of the plates has at least one ridge projecting from the plate into the gap without reaching the opposite plate, forming a localized narrowing of the gap and a thickening of the plate body. At least one ridge extends from a connecting element to an adjacent connecting element, connecting the connecting elements. At least one ridge extends along a circumferential direction connecting two adjacent connecting elements.

9 Claims, 6 Drawing Sheets

(58) Field of Classification Search
USPC .................................................. 188/218 XL
See application file for complete search history.

(56) References Cited

U.S. PATENT DOCUMENTS

| | | | |
|---|---|---|---|
| 4,865,167 A | 9/1989 | Giorgetti et al. | |
| 5,004,078 A | 4/1991 | Oono et al. | |
| 5,542,503 A | 8/1996 | Dunn et al. | |
| 6,131,707 A | 10/2000 | Buechel et al. | |
| 6,145,636 A | 11/2000 | Ikari et al. | |
| 6,325,185 B1 | 12/2001 | Doi et al. | |
| 6,367,599 B2 | 4/2002 | Kobayashi | |
| 7,066,306 B2* | 6/2006 | Gavin | F16D 65/847 |
| | | | 188/218 XL |
| 7,267,210 B2 | 9/2007 | Cornolti et al. | |
| 9,022,182 B2* | 5/2015 | Cavagna | F16D 65/847 |
| | | | 188/71.6 |
| 9,080,625 B2* | 7/2015 | Oberti | F16D 65/128 |
| 9,115,775 B2* | 8/2015 | Pipilis | F16D 65/128 |
| 9,255,617 B2* | 2/2016 | Ronchi | F16D 65/128 |
| 10,024,377 B2* | 7/2018 | Maronati | F16D 65/128 |
| 11,542,996 B2* | 1/2023 | Ronchi | F16D 65/128 |
| 2004/0124047 A1 | 7/2004 | Oberti et al. | |
| 2006/0219500 A1 | 10/2006 | Lu et al. | |
| 2006/0243546 A1 | 11/2006 | Oberti et al. | |
| 2009/0000884 A1 | 1/2009 | Layton et al. | |
| 2009/0035598 A1 | 2/2009 | Hanna et al. | |
| 2010/0122880 A1 | 5/2010 | Hanna et al. | |
| 2012/0111692 A1 | 5/2012 | Chern et al. | |
| 2022/0290729 A1* | 9/2022 | Chiesura | F16D 65/128 |

FOREIGN PATENT DOCUMENTS

| | | |
|---|---|---|
| DE | 102004056645 A1 | 6/2006 |
| DE | 202006017092 U1 | 1/2007 |
| DE | 102013210700 A1 | 12/2014 |
| DE | 202015102580 U1 | 9/2015 |
| EP | 0318687 A2 | 6/1989 |
| EP | 1373751 B1 | 2/2007 |
| EP | 2192321 A1 | 6/2010 |
| EP | 2715179 B1 | 7/2015 |
| EP | 3421833 A1 | 1/2019 |
| GB | 2060796 A | 5/1981 |
| GB | 2286438 A | 8/1995 |
| SI | 23474 A | 3/2012 |
| WO | 2002064992 A2 | 8/2002 |
| WO | 2004102028 A1 | 11/2004 |
| WO | 2006105131 A2 | 10/2006 |
| WO | 2008078352 A1 | 7/2008 |
| WO | 2008135876 A2 | 11/2008 |
| WO | 2011058594 A1 | 5/2011 |
| WO | 2012164465 A1 | 12/2012 |
| WO | 2015092671 A1 | 6/2015 |
| WO | 2016020820 A1 | 2/2016 |
| WO | 2017153873 A1 | 9/2017 |
| WO | 2017153902 A1 | 9/2017 |

* cited by examiner

BRAKING BAND OF A DISC FOR DISC BRAKE OF VENTILATED TYPE

CROSS-REFERENCE TO RELATED APPLICATIONS

This application is a National Phase Application of PCT International Application No. PCT/IB2020/056870, having an International Filing Date of Jul. 22, 2020 which claims priority to Italian Application No. 102019000013929 filed Aug. 5, 2019, each of which is hereby incorporated by reference in its entirety.

FIELD OF THE INVENTION

The present invention relates to a braking band and to a ventilated disc for disc brake, particularly, but not exclusively, for applications in the automobile field, and also to a vehicle having said ventilated disc.

BACKGROUND ART

The brake caliper in a disc brake generally is arranged straddling the peripheral outer margin of a brake disc, adapted to rotate about a rotation axis (A-A) defining an axial direction (X-X). A radial direction (R-R) is also defined in a disc brake, which radial direction is substantially orthogonal to said axial direction (X-X), and a circumferential direction (C-C), which is orthogonal both to said axial direction (X-X) and to said radial direction (R-R), and also a tangential direction (T-T) which is locally, or better punctually orthogonal, both to said axial direction (X-X) and to said radial direction (R-R).

As is known, the discs for disc brake comprise a bell adapted to associated the disc with a hub of a vehicle, from which an annular portion extends, called braking band, intended to act in conjunction with brake pads of a caliper. In the case of discs of ventilated type, the braking band is made by means of two plates facing and connected to each other, respectively, by means of connecting elements, for example in the form of pillars or fins. The outer surfaces of the two plates define opposite braking surfaces, while the inner surfaces delimit, jointly with the pillars or the fins, ventilation channels for cooling the disc, channels in which air flows according to a centrifugal direction during the rotating motion of the disc itself.

Said braking band is intended to act in conjunction with calipers for disc brake adapted to exert a braking action on the vehicle, thus exerting, by means of the aforesaid pads, friction on the opposite surfaces of the two plates, called braking surfaces.

It is known that during the actuation of the brakes, the friction between the pads of the brake calipers and the braking surfaces of the braking band generates an increased quantity of heat which requires being disposed of.

The heat generated indeed causes the occurrence of several undesired phenomena, such as, for example, the deformation of the braking band, the formation of cracks on the braking surfaces or localized transformations of state of the material forming the braking band which in turn result in the deterioration of the braking band itself.

In particular, in the applications on high performance motor vehicles with an increased braking efficiency, the energy to be disposed of is quite high and the aforesaid need to dispose of the heat generated by the braking action is even more felt.

Ventilated discs of the aforementioned type have undergone a continuous evolution over time, in particular concerning the number and shape of the so-called ventilation channels, thus defining the gap formed by the two mutually axially facing plates.

Among the known ventilated discs, the so-called "pillar" discs have shown to be particularly efficient in terms of heat dissipation, i.e. cooling, in which ventilation channels are internally limited by particular pillar connecting elements having limited or substantially little deformed radial and circumferential extension with respect to the axial extension thereof, defined as "pillars", which transversely connect the two plates.

For example, "pillar" ventilated discs are known from EP 1 373 751 B1, in which the pillars are geometrically arranged along three concentric circumferences, which are coaxial to the disc and having different radius, to form three "ranks"; if sectioned on a plane parallel to the two plates and which is median with respect thereto, the pillars have sections of various type (for example, pillars with "rhomboidal" sections in the intermediate and inner ranks; "drop" pillars in the outer rank).

Other ventilated discs with "pillar" structures are known, for example from WO 2004/102028 and from U.S. Pat. No. 5,542,503.

The known ventilated discs include the so-called "fins" or "tabs" discs, in which the ventilation channels are internally limited by particular connecting elements elongated along a main direction, for example directed according to a direction parallel to the radial direction (R-R), or spiral, and which transversely connect the two plates.

It likewise is known that the braking action performed by the pads against the braking surfaces of the disc generates heat, therefore an increase in temperature of the disc up to making the disc itself incandescent in the case of particularly onerous performance. Due to the increased temperature reached by the disc during the braking, the disc is deformed and the contact between the pads and the braking surfaces deteriorates. Moreover, the friction material of the pads undergoes a kind of vitrification and pollution by the material of the disc.

It has also been found that the highest temperature is reached at an annular central portion of the braking surfaces, i.e. at an annular central portion of the outer surfaces of the respective plates. During the life of the disc, such a zone is easily subject to the formation of cracks.

To obviate the above-mentioned drawbacks, the need on the one hand is therefore particularly felt in the field to increase the efficiency of the dispersion of the heat generated by the braking so as to contain the temperatures reached by the disc during and following the braking, and on the other hand, the need to increase the mechanical resistance of the central portions of the braking band.

Solutions are known from WO 2004/102028 and also from WO 2002/064992, U.S. Pat. Nos. 7,066,306, 7,267, 210, US 2006 0243546, US 2004 0124047, U.S. Pat. Nos. 6,367,599, 5,542,503 and 4,865,167. Although they are satisfactory from various viewpoints, these known solutions do not allow a compromise to be reached between the desired mechanical resistance in the central annular zone of the braking band and the contrasting need to maximize, in the same zone, the flow of air capable of removing the strong localized increase in temperature caused by the braking action.

However, it is worth noting that ventilated discs of the mentioned type do not in themselves provide a solution to a further problem which occurs simultaneously with the above-mentioned problems and which is to be resolved at the same time, a problem which may affect the disc brakes, in particular the disc brake with ventilated disc, a problem briefly disclosed hereinbelow.

As is known, during the actuation of the brakes, the disc and the braking bands in particular may mechanically vibrate, at various frequencies correlated with the various vibration modes of the disc itself. Such vibrations of the disc may result, for example from resonances triggered by vibrations of objects mechanically coupled to the disc which are stressed in braking step should the vibration frequencies of such objects coincide with or be sufficiently close to the vibration frequencies of the disc.

It is also known that the above vibrations cause audible noise, in particular in the form of annoying whistling, when the resonance frequencies are in the audible range (for example, between 2 and 9 kHz, with subsequent more or less acute whistling).

Therefore, the need emerges of devising solutions for reducing or eliminating such whistling by means of constructing contrivances which "move" the vibration frequencies of the disc to different values than the excited ones.

Some solutions are known for discs with different structures from the mentioned "pillar" structures.

For example, IT 1 273 754 has braking bands with protrusions projecting into the inner part of the plates, towards the gap between the two plates, in particular positions and with masses specifically identified in order to reduce the vibrations which occur and the subsequent noise.

Other ventilated discs with structures adapted to reduce annoying vibrating phenomena are known, for example from U.S. Pat. No. 4,523,666.

Document U.S. Pat. No. 3,983,973 of Knorr-Bremse GmbH shows a brake disc comprising a pair of friction plates spaced apart from each other to form a ventilation channel. A braking force may be applied against said plates by means of a brake pad braking gasket. The two plates are interconnected by a plurality of ribs or flow guide fins so as to define ventilation passages between the friction plates. Strips of anti-vibration material are positioned in radial grooves formed in the mutually facing surfaces of the friction plates. These inserts are formed by metal elements which dampen the vibrations and have a greater expansion coefficient than the one of the ferrous material with which the friction plates are made, such as lead, bronze or copper.

A similar solution is known from US2009035598.

It is known from document US2012111692 to couple passive dampers of the Squawk type with the braking device to reduce the vibrations.

It is known from solutions U.S. Pat. No. 6,131,707, WO2016020820, WO2017153902, WO2017153873, EP0318687, WO2011058594, WO2006105131, US2006219500, U.S. Pat. No. 6,145,636, US2010122880, U.S. Pat. Nos. 6,325,185, 4,523,666, 5,004,078, SI23474, GB2060796, DE102013210700, EP3421833, WO2015092671, GB2286438, DE102004056645, EP2192321, WO2008078352, U.S. Pat. No. 3,983,973, DE202006017092, US20090000884, DE202015102580 to provide connections between the unevenly-distributed plates of the circumferentially-distributed braking band in order to reduce the vibrations excited by the braking action and to increase the ventilation in the gap.

However, these distributions of the connecting elements of the plates create structural non-uniformities capable of generating entirely unwanted stresses concentrated in the braking band under certain circumstances of the braking action.

Therefore, the need arises for new structures of ventilated discs which are capable of simultaneously offering, in braking step, both particularly efficient cooling performance and vibration and noise minimization properties and at the same time avoiding causing concentrated stresses in the braking band which could compromise the integrity and life thereof.

The aforesaid known examples of ventilated discs and related braking bands are not capable of adequately meeting all the mentioned and strongly desired needs.

Document EP 2 715 179 B1 of the same Applicant partly resolves these problems, and in particular attempts to reduce the frequencies of the vibrating modes of the braking band which result in vibrations outside the plane itself of the plates of the band itself. In particular, this solution has ridges which overhangingly project into the gap, which are arranged between connecting elements.

Although satisfactory from many viewpoints, this known solution does not completely resolve the problem and in particular, has highlighted how the need is felt to find solutions which allow the shape of the surfaces delimiting the gap of the braking band.

Therefore, the need remains strongly felt to increase the mass of the braking band near the outer edge thereof in order to reduce the vibrating methods of the braking band of the "out of plane" type which affect the performance of the brake quite negatively if excited.

Simultaneously, the need remains strongly felt to keep a distance between ridges and connecting elements, especially near the outer edge of the disc, for example to simplify the production process of the core which allows making the braking band by founding: since the geometry of the pillars is achieved due to the core which geometrically represents the spaces between one pillar and the other, it is required to ensure minimum sections so the sand for the cores is capable of filling all the spaces which will form the gap and furthermore, said core has minimum sections capable of providing a structural resistance of the core itself which is sufficient for the handling thereof and the melting of the braking band.

Furthermore, the contrasting need is strongly felt to avoid a broad annular area of the gap which is empty of connecting elements or protrusions, thus avoiding a poor distribution of the temperature on the braking band such as to generate a vibration of the disc or other out-of-balance phenomenon.

Therefore, the problem at the basis of the present invention is the one of devising a braking band and a disc for disc brake which have structural and functional features such as to meet the aforesaid needs while obviating the drawbacks mentioned with reference to the known art.

Solution

The aim of the present invention is to provide a braking device in which the tendency to create these vibratory waves and subsequent whistling is reduced.

These and other objects and advantages are achieved by a braking band, a disc brake disc, and a vehicle as described and claimed herein.

Certain advantageous embodiments are the subject of the dependent claims.

From the analysis of this solution, it has emerged how the solution proposed allows a superior braking comfort to be achieved with respect to solutions of the prior art, therefore a reduction of the vibrations and in particular, an absence of vibrations resulting in whistling.

Moreover, the solution proposed maintains a very high, and in certain embodiments even improved, disc cooling efficiency, for example the efficiency is strongly improved due to the increased turbulence of the flow of air flowing through the gap of the braking band, a turbulence caused by the specific shape of the ridges in the plate(s) and arranged between the connecting elements and extending in circumferential direction.

Furthermore, the solutions proposed allow the mass of the braking band arranged near the outer edge thereof to be increased in order to reduce the vibrating methods of the braking band of the "out of plane" type which affect the performance of the brake quite negatively if excited.

Again furthermore, due to the solutions proposed, a distance may be ensured between the ridges and the connecting elements, especially near the outer edge of the disc, thus simplifying the production process. For example, a minimum distance to be ensured was detected between the connecting elements and the ridges (variable from 5 mm to 7 mm, typically 6 mm) for the convenient feasibility of the founding core with which the braking band is made: since the geometry of the connecting elements is achieved due to the core which geometrically represents the spaces between one connecting element and the other, it is required to ensure minimum sections so the foundry sand is capable of filling all the spaces and also to ensure the structural resistance of the core itself.

Again furthermore, due to the solutions proposed, it is possible to avoid a broad annular area of the gap which is empty of connecting elements or ridges, thus avoiding a poor distribution of the temperature on the braking band such as to generate a vibration of the disc or another out-of-balance phenomenon.

Again furthermore, due to the solutions proposed, the mass near the outer edge may be increased while avoiding to occlude or narrow the ventilation channel too much and at the same time structurally strengthening the band to limit the formation and propagation of cracks.

Again furthermore, an increase in the resistance to braking due to an elevated temperature may be ensured due to the solutions proposed.

Again furthermore, due to the solutions proposed, ridges capable of further increasing the available surface for the heat exchange may be ensured.

FIGURES

Further features and advantages of the device, of the disc brake and of the vehicle will be apparent from the following description of preferred and non-limiting embodiments thereof, with reference to the accompanying Figures, in which.

DESCRIPTION OF SOME PREFERRED EMBODIMENTS

Figure 1:
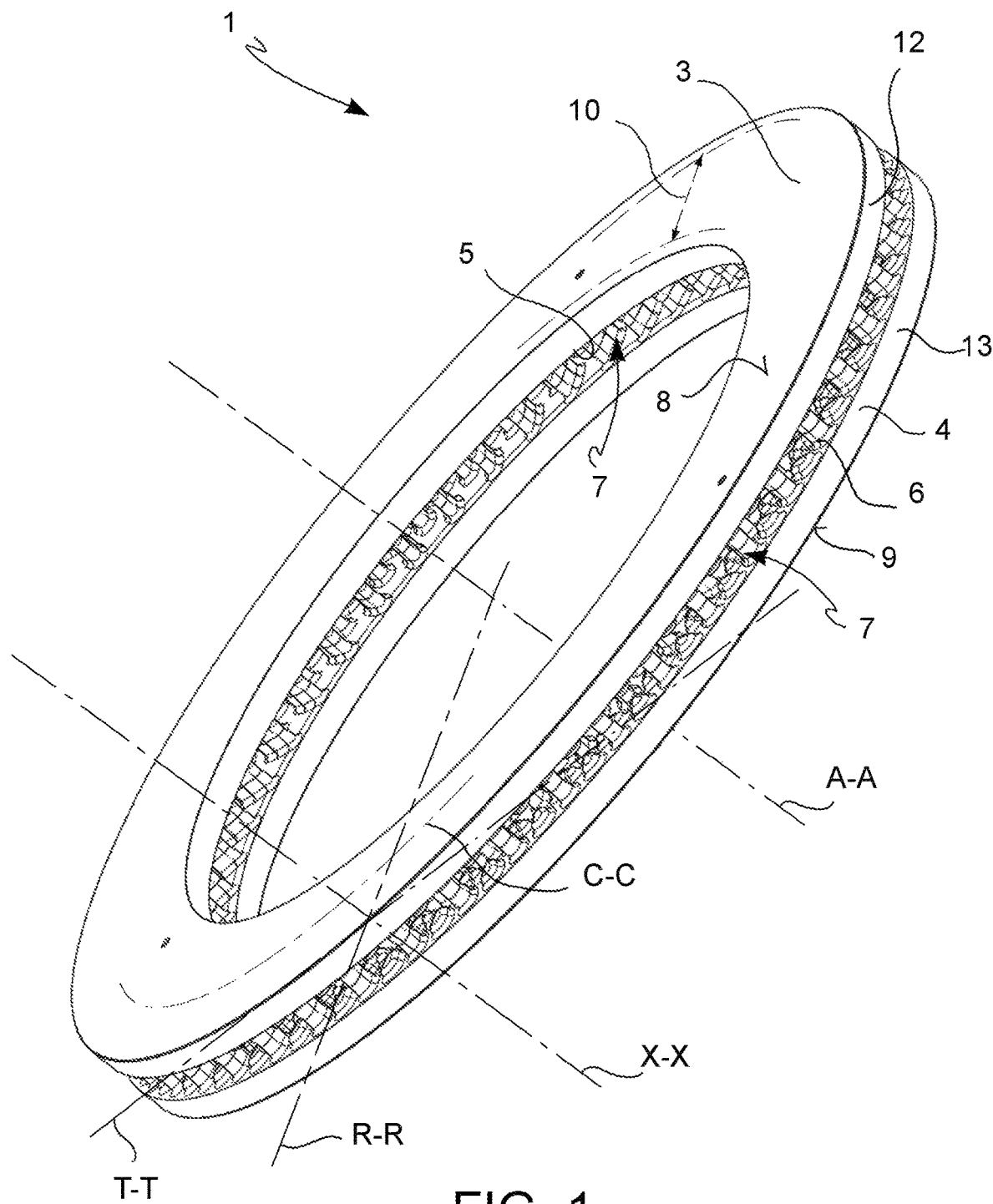
FIG. 1 shows an axonometric view of a braking band according to the present invention.
Figure 2:
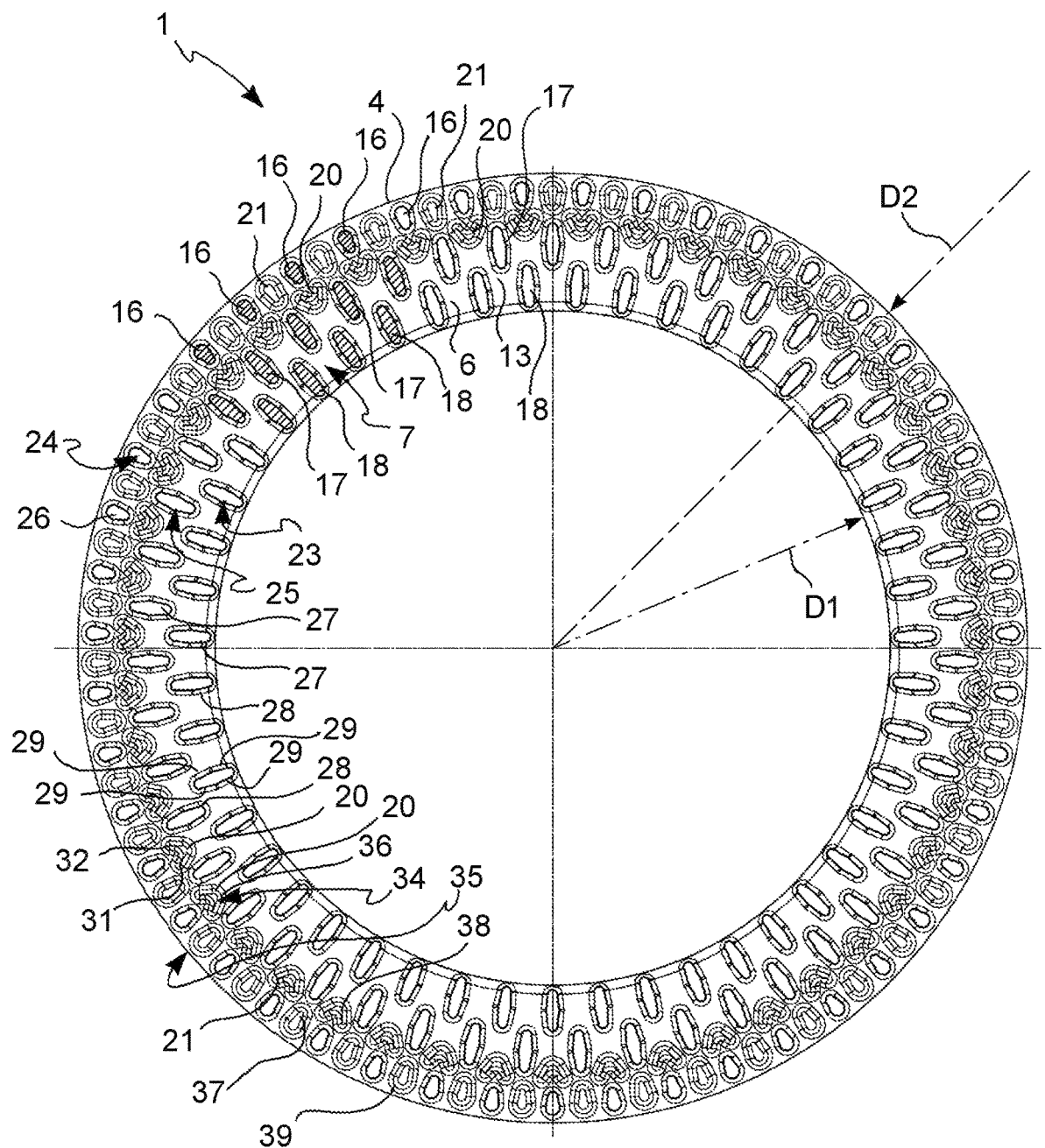
FIG. 2 shows a plan view of the braking band in FIG. 1, sectioned along a median flow plane of the fluid which flows through the gap.
Figure 3:
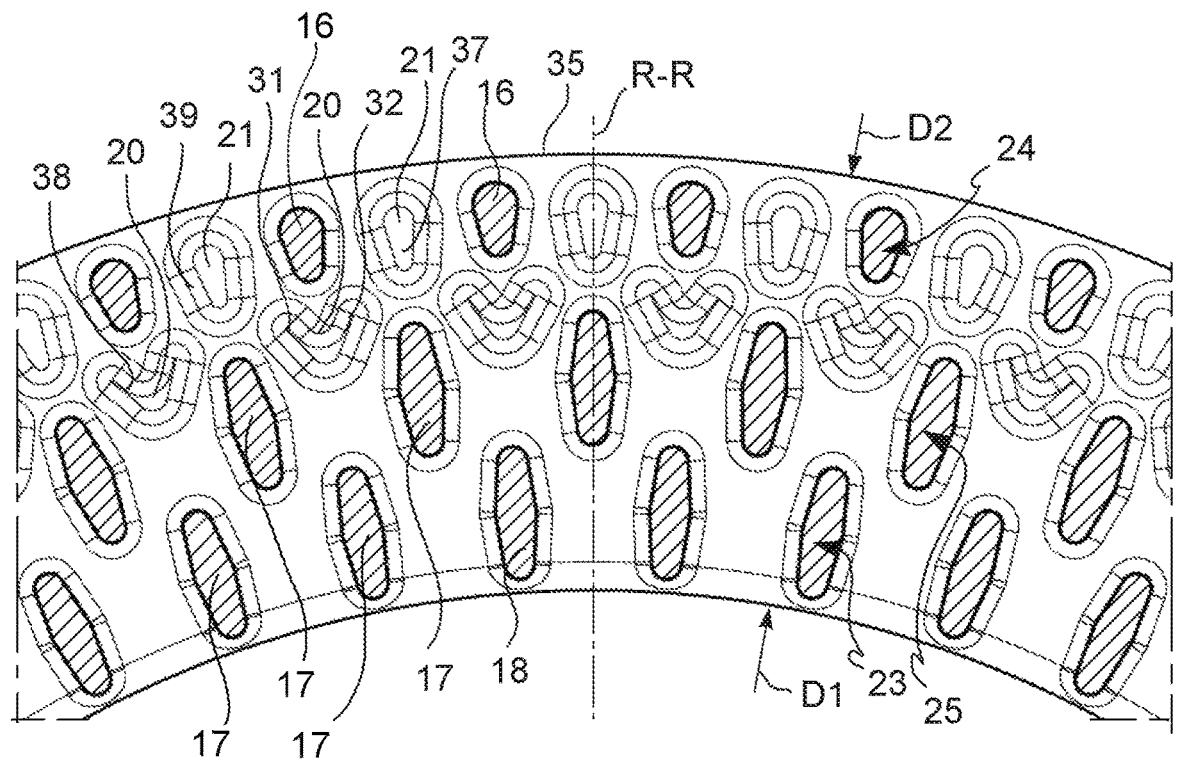
FIG. 3 shows an enlarged detail of the section of braking band in FIG. 2.
Figure 4:
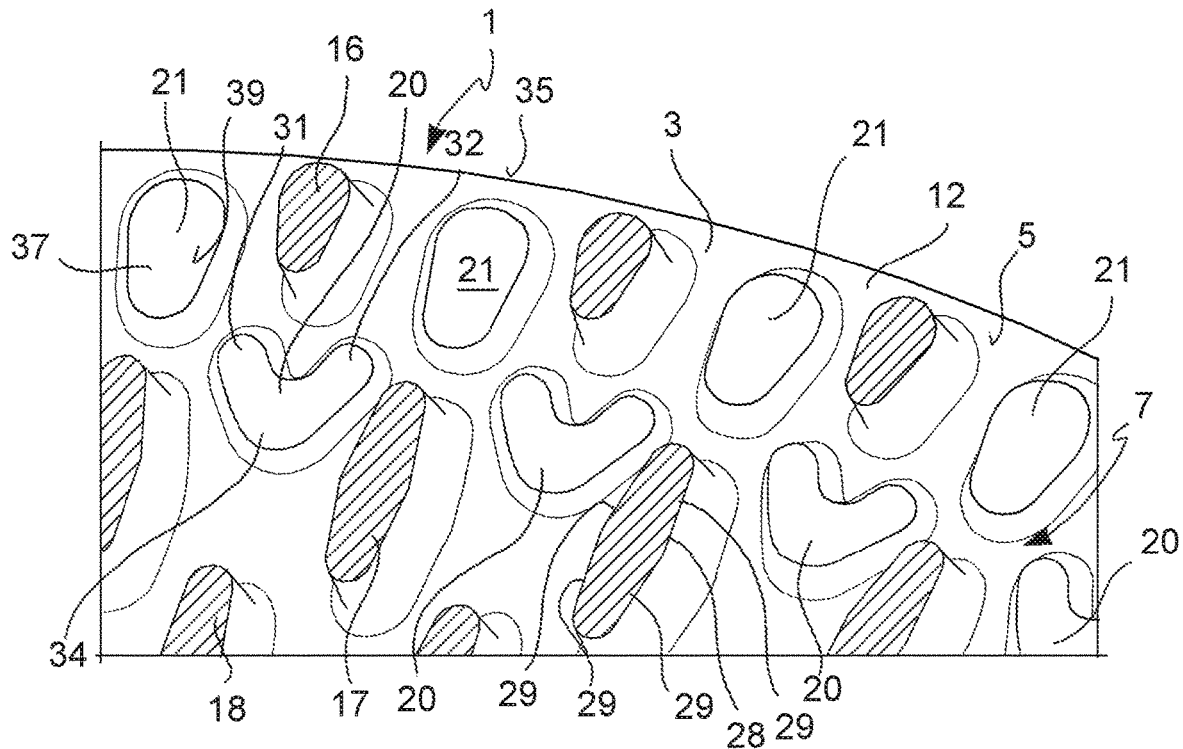
FIG. 4 shows an axonometric view of a detail of the section in FIG. 3.
Figure 5:
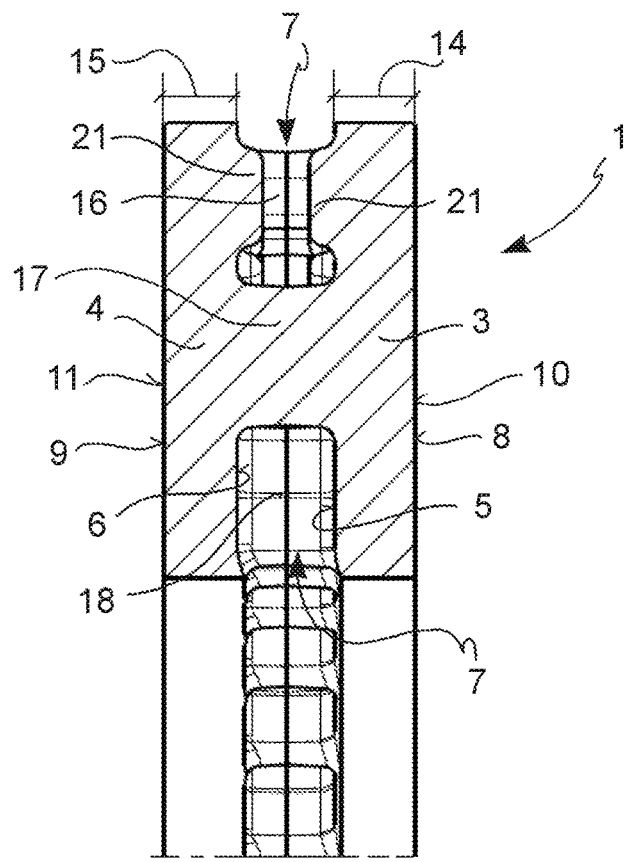
FIG. 5 shows a section of the braking band in FIG. 1, along a plane containing the axial and radial direction, in which the shapes of the further ridge are highlighted.
Figure 6:
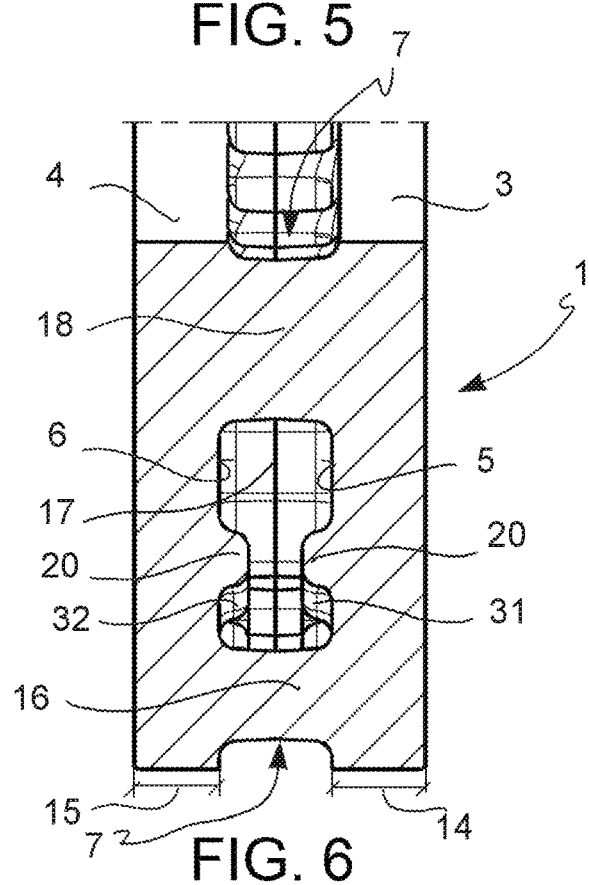
FIG. 6 shows a section of the braking band in FIG. 1, along a plane containing the axial and radial direction, in which the shapes of the ridge are highlighted.
Figure 7:
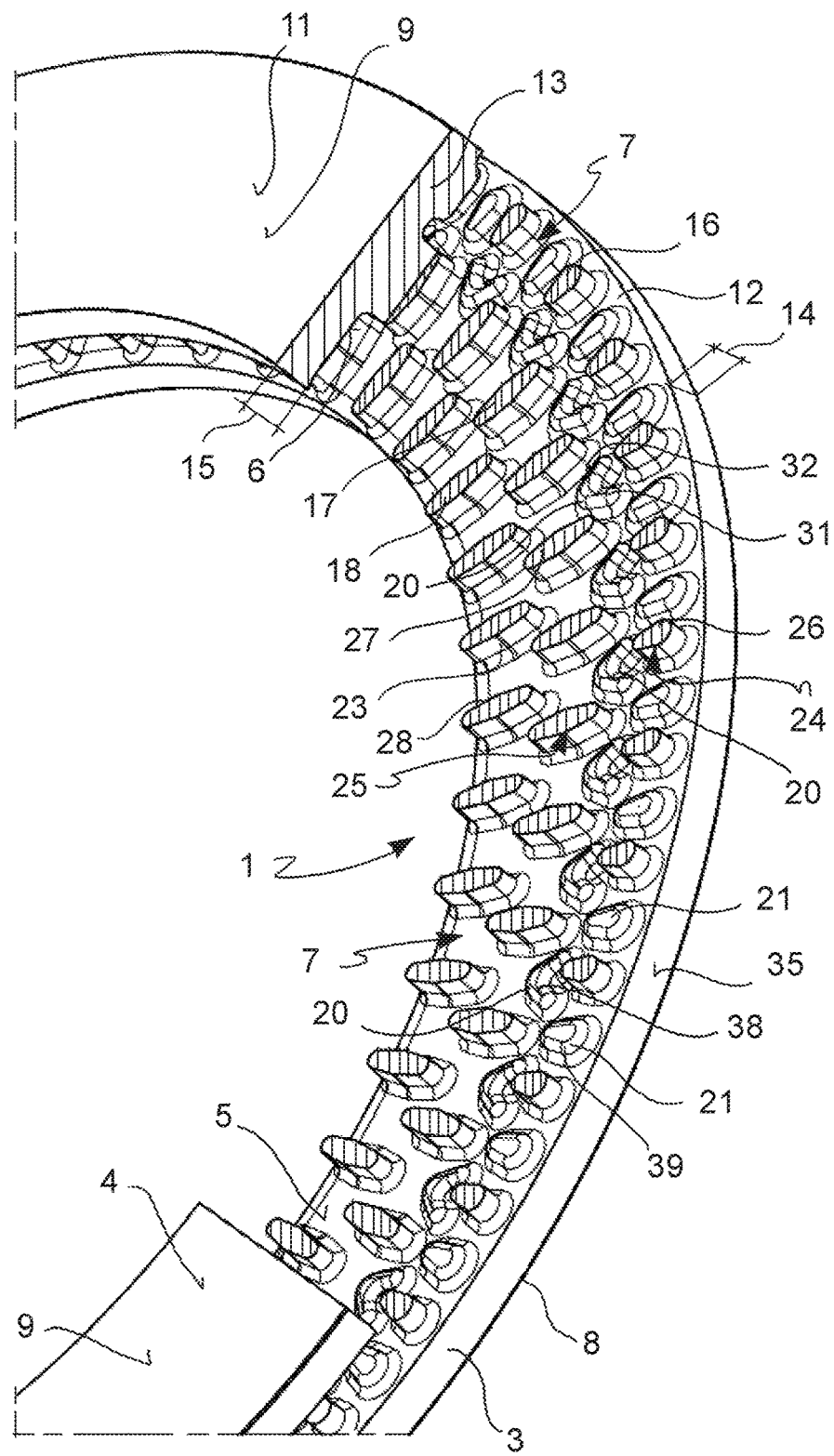
FIG. 7 shows an axonometric and partially cross-sectioned view of the braking band in FIG. 1.
Figure 8:
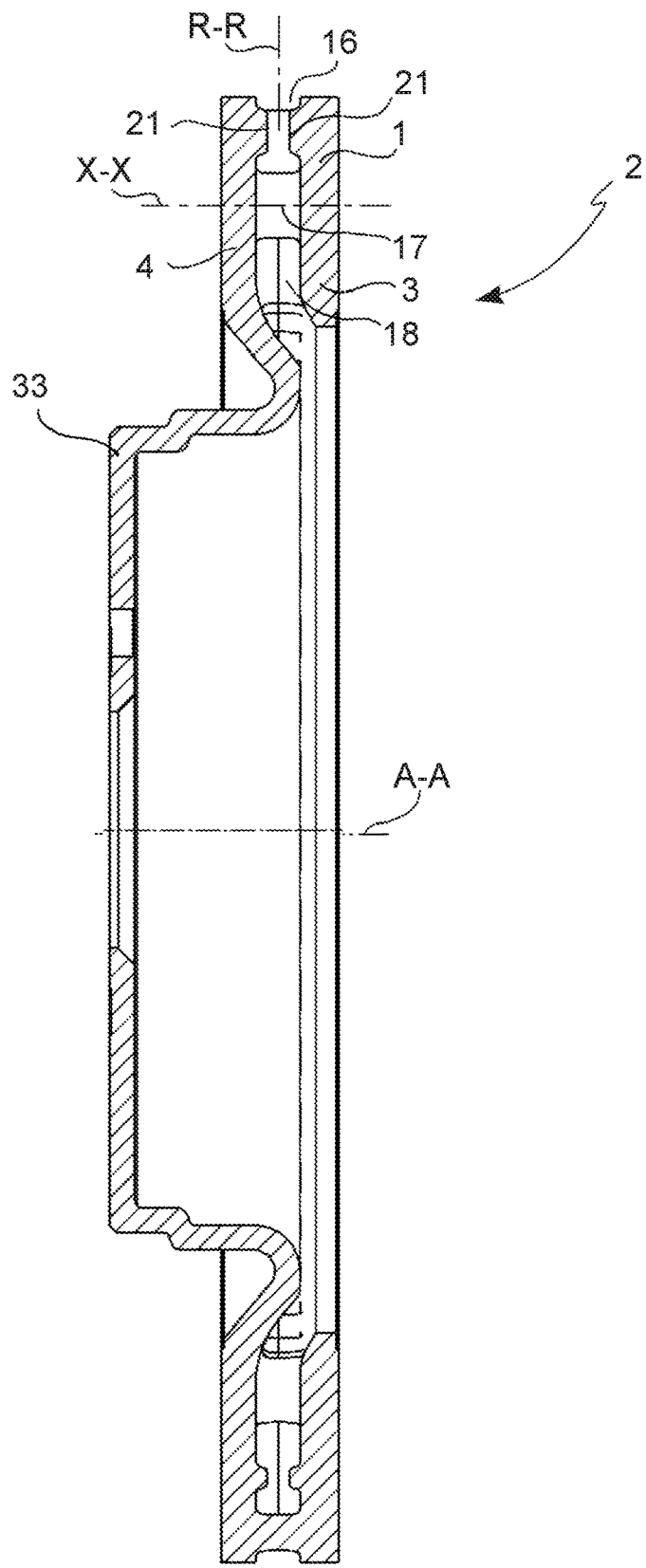
FIG. 8 shows a section of a brake disc comprising a braking band according to the present invention, along a plane containing the axial and radial direction.

According to a general embodiment, a braking band 1 of a disc for disc brake 2 of ventilated type is provided.

Said braking band 1 extends between an inner diameter D1, near a rotation axis X-X of the braking band 1, and an outer diameter D2, far from said rotation axis X-X. Said rotation axis defines an axial direction X-X.

Said braking band 1 defines a radial direction R-R, substantially orthogonal to said axial direction X-X, and a circumferential direction C-C, orthogonal to said axial direction X-X and to said radial direction R-R.

Said braking band 1 comprises two mutually facing plates 3, 4.

Said plates 3, 4 comprise inner surfaces 5, 6, either directly or indirectly mutually facing and delimiting a gap 7 which defines a ventilation duct for the braking band 1.

Said plates 3, 4 comprise outer surfaces 8, 9.

Said outer surfaces 8, 9 comprise flat and mutually opposite circumferential portions which form braking surfaces 10, 11. In other words, portions of the outer surfaces 8, 9 act in conjunction with brake pads received in a brake caliper to exert a braking action when sandwiched against the braking band 1. The portion of the outer surfaces 8, 9 which is brushed or involved by the pads defines the braking surfaces 10, 11.

Said plates 3, 4 comprise a plate body 12, 13 having an extension in axial direction X-X or plate thickness 14, 15. In other words, when assessed in axial direction, each plate 3, 4 shows a plate thickness 14, 15 which is given by the thickness in axial direction of the plate body 12 of plate 3, 4.

Said plates 3, 4 are joined to each other by heat dissipating elements or connecting elements 16, 17, 18 of the plates 3, 4.

Said connecting elements 16, 17, 18 are shaped as columns and/or ribs which project from a plate towards the opposite plate in the form of bridges which connect the plates 3, 4.

At least one of the plates 3; 4 comprises at least one ridge 20, 21 which projects from said plate 3; 4 into said gap 7 without reaching the opposite plate 4; 3.

Said ridge 20, 21 forms at least one localized narrowing of said gap 7. In other words, travelling said gap 7, a reduction of the section in axial direction X-X of the width of gap 7 is encountered when said ridge 20, 21 is reached.

Said ridge 20, 21 forms at least one thickening of the plate body 12; 13, thus creating a localized increase of said plate thickness 14; 15. In other words, considering the thickness in axial direction X-X of the body of a plate, thickness 14, 15 increases at said ridge 20, 21.

According to a general embodiment, a braking band 1 of a disc for disc brake 2 of ventilated type extends between an inner diameter D1, near a rotation axis X-X of the braking band 1, and an outer diameter D2, far from said rotation axis X-X, said rotation axis defining an axial direction X-X.

Said braking band 1 defines a radial direction R-R, substantially orthogonal to said axial direction X-X, and a circumferential direction C-C, orthogonal to said axial direction X-X and to said radial direction R-R, and a tangential direction T-T, punctually orthogonal to said axial direction X-X and a radial direction R-R.

Said braking band 1 comprises two mutually facing plates 3, 4.

Said plates 3, 4 comprise inner surfaces 5, 6, either directly or indirectly facing and delimiting a gap 7.

Said plates 3, 4 comprise a plate body 12, 13 having a predetermined extension in axial direction X-X or predetermined plate thickness 14, 15.

Said plates 3, 4 are joined to each other by heat dissipating and connecting elements 16, 17, 18, also named connecting elements.

Said connecting elements 16, 17, 18 are shaped as columns and/or ribs and/or fins which project from a plate towards the opposite plate, whereby forming bridges which connect the plates 3, 4 to each other.

At least one of the plates 3, 4 comprises at least one ridge 20, 21 which projects from said plate 3, 4 into said gap 7 without reaching the opposite plate 4, 3, whereby forming at least one localized narrowing of said gap 7 and a thickening of the plate body 12, 13, whereby creating a localized increase of said plate thickness 14, 15.

Said at least one ridge 20, 21 remains separated from each connecting element 16, 17, 18, in which the thickness of at least one plate 3, 4 about said at least one ridge 20, 21 is substantially equal to said predetermined plate thickness 14, 15.

Advantageously, said at least one ridge 20 extends forming at least two separate ridge branches 31, 32.

According to one embodiment, the thickness of the at least one plate 3, 4 between said at least two ridge branches 31, 32 is substantially equal to said predetermined plate thickness 14, 15.

According to one embodiment, said inner surfaces 5, 6 are flat surfaces.

According to one embodiment, said plates 3, 4, comprise outer surfaces 8, 9. Said outer surfaces 8, 9 comprise flat and opposite annular portions which form braking surfaces 10, 11. The distance between said inner surfaces 5, 6 and said braking surfaces 10, 11 defines said predetermined plate thickness 14, 15.

According to one embodiment, the maximum axial width or axial extension of said gap 7 is reached between said at least one ridge 20, 21 and each adjacent connecting element.

According to one embodiment, said at least one ridge 20 and its at least two separate ridge branches 31, 32 have a symmetrical shape with respect to a plane containing an axial direction X-X and a radial direction R-R.

According to one embodiment, said braking band 1 has a band outer edge 35 at said band outer diameter D2. Viewed on a plane comprising a radial direction R-R and circumferential direction C-C, said at least one ridge 20 and its at least two separate branches 31, 32 form a branched ridge 34; said branched ridge 34 is "V"-shaped and forms a concavity facing the outer edge of the disc.

According to one embodiment, viewed on a plane comprising a radial direction R-R and circumferential direction C-C, said at least one ridge 20 and its at least two separate branches 31, 32 form a branched ridge 34; said branched ridge 34 is crescent-shaped.

According to one embodiment, said at least one ridge 20 comprises a cylinder-shaped ridge central body 36 from which said at least two separate ridge branches 31, 32 project.

According to one embodiment, the extensions of said at least two ridge branches 31, 32 are arranged straddling at least one connecting element 16.

According to one embodiment, said braking band 1 comprises at least one further ridge 21.

According to one embodiment, the extension of at least one of said at least two branches 31, 32 intersects said at least one further ridge 21.

According to one embodiment, said braking band 1 comprises at least two further ridges 21 arranged at the sides of a connecting element 16.

According to one embodiment, the extension of said at least two branches 31, 32 each intersects at least one further ridge 21.

According to one embodiment, seen on a plane comprising a radial direction R-R and circumferential direction C-C, said at least one further ridge 21 is drop-shaped.

According to one embodiment, said at least one further ridge 21 has a further ridge tapered extension 37 tapered in radial direction R-R, preferably directed towards said rotation axis X-X.

According to one embodiment, said at least one further ridge 21 is a plurality of further ridges 21.

According to one embodiment, said at least one further ridge 21 is a plurality of further ridges 21 arranged near a band outer edge 35.

According to one embodiment, said at least one further ridge 21 is a plurality of further ridges 21 evenly distributed along a circumference.

According to one embodiment, said at least one further ridge 21 is a plurality of further ridges 21 arranged between a plurality of connecting elements 16.

According to one embodiment, said at least one ridge 20 and its at least two separate ridge branches 31, 32 are a plurality of ridges 20, each with respective at least two separate ridge branches 31, 32.

According to one embodiment, said at least one ridge 20 and its at least two separate ridge branches 31, 32 are a plurality of ridges 20 evenly distributed along a circumference.

According to one embodiment, said at least one ridge 20 and its at least two separate ridge branches 31, 32 are a plurality of ridges 20 arranged at least partly between connecting elements 17.

According to one embodiment, at least one circumference concentric to the rotation axis X-X of the braking band 1, which is arranged on said inner surfaces 5, 6 and intersects said connecting elements 17 of an inner or intermediate rank, also intersects said at least one ridge 20.

According to one embodiment, at least one circumference concentric with a rotation axis X-X of the braking band 1, which is arranged on said inner surfaces 5, 6 and intersects said connecting elements 16 of an outer rank, also intersects said at least one further ridge 21.

According to one embodiment, viewed on a plane comprising a radial direction R-R and circumferential direction C-C, said at least one ridge 20 and its at least two separate branches 31, 32 form a branched ridge 34; said branched ridge 34 has a rounded ridge outer surface 38 joined to said inner surface 5 or 6 from which it projects into gap 7.

According to one embodiment, viewed on a plane comprising a radial direction R-R and circumferential direction C-C, said at least one further ridge 21 has a rounded further ridge outer surface 39 joined to said inner surface 5 or 6 from which it projects into gap 7.

According to one embodiment, said connecting elements 16, 17, 18 are grouped into at least two rows or ranks 23, 24, 25 arranged circumferentially. A first of said ranks 23 is arranged internally in a radial direction or towards said axis X-X near said inner diameter D1. A second of said ranks 24 is radially located further from said axis X-X near said outer diameter D2.

According to one embodiment, at least one third of said ranks 24 is arranged radially between said first inner row 23 and said second outer row 24.

According to one embodiment, each connecting element 16 of said second of said ranks 24 has three ridges 20, 21 for each plate facing it on three sides.

According to one embodiment, said at least one ridge 20 or 21 is at least a plurality of ridges; each plurality of said ridges 20 or 21 is arranged between connecting elements 16 or 17 of the same rank 23, 24.

According to one embodiment, said at least one ridge 20 or 21 projects into said gap 7 from only one of said plates 3, 4.

According to one embodiment, said at least one ridge 20 or 21 is at least two ridges 20 or 21 and said at least two ridges 20 or 21 project into said gap 7 from both said plates 3, 4.

According to one embodiment, said at least one ridge 20 or 21 is at least two ridges 20 or 21 and said at least two ridges 20 or 21 project into said gap 7 from both said plates 3, 4 and face each other.

According to one embodiment, said at least one ridge 20 or 21 is at least two ridges 20 or 21 and said at least two ridges 20 or 21 project into said gap 7 from both said plates 3, 4 and are mutually, at least partially, offset.

According to one embodiment, at least some of said connecting elements 16, 17, 18 are fins or ribs which have an elongated shape section, e.g. in radial direction R-R, on a plane substantially parallel to the flow of air along gap 7.

According to one embodiment, said connecting elements 16 close to the band outer diameter D2 or outer rank 24 have an elongated drop-shaped section in radial direction R-R on a plane substantially parallel to the flow of air along gap 7.

According to one embodiment, at least two of said connecting elements 17, 18 have, on a plane substantially parallel to the flow of air along gap 7, a diamond- or rhombus-shaped section 27 with four vertices 28 joined by four sides 29 in which said sides delimiting said section are substantially rectilinear in shape.

According to one embodiment, all the ridges 20, 21 of said ridges 20, 21 are arranged in a circular portion of said gap 7 near said band outer diameter D2.

According to one embodiment, all the ridges 20, 21 of said ridges 20, 21 are arranged in a circular portion of said gap 7 near which an outer rank 24 of connecting elements 16 is present.

The present invention likewise relates to a disc brake disc 2 comprising a braking band 1 according to any one of the above-described embodiments.

The present invention likewise relates to a vehicle comprising a braking band 1 according to any one of the above-described embodiments.

Those skilled in the art may make several changes and adaptations to the above-described embodiments, and may replace elements with others which are functionally equivalent in order to meet contingent and specific needs, without however departing from the scope of the following claims.

The assembly of ridges 20, 21 arranged near one another forms a group of ridges 20, 21 which is arranged circumferentially, thus creating a circumferential distribution which has circumferential discontinuities concentrated near the outer diameter D2 of the braking band and capable of creating an uneven distribution of the assembly of ridges, a distribution adapted to avoid the presence of vibrating modes of the braking band 1 which, when arranged to resonate, create annoying noises or whistling.

An embodiment of the present invention is described below.

According to one embodiment, a braking band 1 has an outer diameter D2 of 415 mm, an inner diameter of 295 mm and a thickness of 33 mm.

Gap 7, or the ventilation channel, has a height assessed in axial direction X-X of 12.6 mm.

The two plates 3, 4 are connected to each other by connecting elements 16, 17, 18 in the form of columns arranged over three concentric rows or ranks 23, 24, 25 and said connecting elements 16, 17, 18 are arranged according to a staggered arrangement.

The connecting elements in the outer rank 24 have a drop shape assessed on an average flow plane which travels gap 7, with tapered extension directed according to the radial direction R-R and facing the rotation axis X-X.

The connecting elements 17, 18 in the intermediate rank 25 and inner rank 23 have a rhomboidal shape assessed on an average flow plane which travels gap 7.

Each rank has 47 connecting elements 16 or 17 or 18.

Further ridges 21 are present in the outer rank 23 between each connecting element 16. Said further ridges 21 have a drop shape on a plane containing a radial direction R-R and circumferential direction C-C, with tapered extension directed according to the radial direction R-R and facing the rotation axis X-X.

Ridges 20 are present in the intermediate rank 25 between each connecting element 17. Said further ridges 20 have, on a plane containing a radial direction R-R and circumferential direction C-C, a branched shape 34, i.e. a cylindrical central body from which a first and a second ridge branch 31, 32 project separately from each other.

Said ridge 20 has extension in axial direction of 3.4 mm. The base of said ridge 20 has a radius of 4 mm. The overall height of the shape of ridge 20 is 9.7 mm and the overall width including the branches is 13.5 mm.

The outer surface 38 of ridge 20 is joined to the flat inner surface 5 or 6 with a radius of 2 mm.

The modal analysis performed in a frequency range from 20 to 10,000 Hz (with material having Young's modulus of 112,000 MPa, Poisson's ratio of 0.263 and a density of 7.113 kg/dm showed the following values of interest compared with the solution described in EP 2 715 179 B1 of the same Applicant:

|  | Mode I K(0;2) | Mode II K(0;3) | Mode III K(0;4) |
|---|---|---|---|
| 1 projection band disc frequency [Hz] according to EP 2 715 179 B1 | 530 | 1271 | 2054 |
| 2 projection band (half moon) disc frequency [Hz] according to the present invention | 526 | 1260 | 2038 |
| % further reduction | −0.75% | −0.87% | −0.78% |

LIST OF REFERENCES 1 braking band
2 disc brake disc
3 plate
4 plate
5 inner surface
6 inner surface
7 gap
8 outer surface
9 outer surface 10 braking surface
11 braking surface
12 plate body
13 plate body
14 plate thickness
15 plate thickness
16 connecting elements
17 connecting elements
18 connecting elements
20 ridge
21 ridge
23 ranks
24 ranks
25 ranks
26 pillars
27 fins or ribs
28 rhombus or diamond with four vertices
29 rhombus sides
31 first ridge branch
32 second ridge branch
33 bell
34 branched ridge
35 band outer edge
36 ridge central body
37 further ridge tapered extension
38 ridge outer surface
39 further ridge outer surface
A-A rotation axis of the braking band or of the brake disc
X-X rotation axis or axial direction
R-R radial direction
C-C tangential direction
D1 band inner diameter
D2 band outer diameter
T-T tangential direction

The invention claimed is:

1. A braking band of a disc brake disc of ventilated type, said braking band extending between an inner diameter, near a rotation axis (X-X) of the braking band, and an outer diameter, far from said rotation axis (X-X), said rotation axis (X-X) defining an axial direction (X-X); said braking band defining a radial direction (R-R), orthogonal to said axial direction (X-X), and a circumferential direction (C-C), orthogonal to said axial direction (X-X) and to said radial direction (R-R), and a tangential direction (T-T) orthogonal to said axial direction (X-X) and said radial direction (R-R); said braking band comprising two mutually facing plates; said two mutually facing plates comprising inner surfaces, either directly or indirectly facing and delimiting a gap; said two mutually facing plates each comprising a plate body having a predetermined extension in the axial direction (X-X) or a predetermined plate thickness; said two mutually facing plates being joined to each other by heat dissipating and connecting elements, hereinafter connecting elements; said connecting elements being shaped as columns, ribs or fins projecting from one plate of said two mutually facing plates towards an opposite plate of said two mutually facing plates, forming bridges which connect the of said two mutually facing plates to each other; wherein one plate of said two mutually facing plates comprises at least one ridge which projects from said plate into said gap without reaching the opposite plate of said two mutually facing plates, forming at least one localized narrowing of said gap and a thickening of the plate body, creating a localized increase of said predetermined plate thickness; wherein
said at least one ridge remains separated from each connecting element, wherein a thickness of at least one plate of said two mutually facing plates about said at least one ridge is substantially equal to said predetermined plate thickness; wherein
said at least one ridge extends forming at least two separate ridge branches; and wherein extensions of said at least two separate ridge branches are arranged straddling at least one connecting element.

2. The braking band of claim 1, wherein
said braking band comprises at least one further ridge; and wherein said braking band further comprises at least one of the following features or a combination thereof:
an extension of at least one of said at least two separate ridge branches intersects said at least one further ridge;
said braking band comprises at least two further ridges arranged at sides of a connecting element;
extensions of said at least two separate ridge branches each intersect at least one further ridge;
viewed on a plane comprising the radial direction (R-R) and the circumferential direction (C-C), said at least one further ridge is drop-shaped;
said at least one further ridge comprises a further ridge tapered extension, tapered in radial direction (R-R).

3. The braking band of claim 2, wherein
said at least one further ridge is a plurality of further ridges; and wherein said braking band further comprises at least one of the following features or a combination thereof:
said at least one further ridge is a plurality of further ridges arranged near a band outer edge;
said at least one further ridge is a plurality of further ridges evenly distributed along a circumference;
said at least one further ridge is a plurality of further ridges arranged between a plurality of connecting elements;
said at least one ridge and the at least two separate ridge branches are a plurality of ridges, each with respective at least two separate ridge branches;
said at least one ridge and the at least two separate ridge branches are a plurality of ridges evenly distributed along a circumference;
said at least one ridge and the at least two separate ridge branches are a plurality of ridges arranged at least in part between the connecting elements;
at least one circumference concentric to the rotation axis (X-X) of the braking band, arranged on said inner surfaces and intersecting the connecting elements of an inner or intermediate rank, also intersects said at least one ridge;
at least one circumference concentric to the rotation axis (X-X) of the braking band, arranged on said inner surfaces and intersecting the connecting elements of an outer rank, also intersects said at least one further ridge;
viewed on a plane comprising the radial direction (R-R) and the circumferential (C-C) direction, said at least one ridge and the at least two separate ridge branches form a branched ridge, and said branched ridge is a rounded outer ridge connected to an inner surface from which it projects into the gap;
viewed on a plane comprising the radial direction (R-R) and the circumferential direction (C-C), said at least one further ridge comprises a rounded further ridge outer surface connected to an inner surface from which it projects into the gap.

4. The braking band of claim 1, wherein said connecting elements are grouped into at least two ranks arranged circumferentially; wherein
- a first rank of said at least two ranks is an inner rank internally arranged in the radial direction or towards said rotation axis (X-X) near said inner diameter; and wherein
- a second rank of said at least two ranks is an outer rank radially located further from said rotation axis (X-X) near said outer diameter; and wherein said braking band further comprises at least one of the following features or a combination thereof:
- at least one third or intermediate rank is radially arranged between said inner rank and said outer rank;
- each connecting element of said outer rank comprises three ridges or a combination of ridges and further ridges for each plate facing said connecting element on three sides;
- said at least one ridge is at least a plurality of ridges, and each plurality of ridges is arranged between the connecting elements of a same rank;
- said at least one ridge or at least one further ridge projects into said gap from only one of said two mutually facing plates;
- said at least one ridge or at least one further ridge is at least two ridges and said at least two ridges project into said gap from both said two mutually facing plates;
- said at least one ridge or at least one further ridge is at least two ridges and said at least two ridges project into said gap from both said two mutually facing plates and face each other;
- said at least one ridge or at least one further ridge is at least two ridges and said at least two ridges project into said gap from both said two mutually facing plates and are mutually, at least partially, offset.

5. The braking band of claim 4, wherein
at least some of said connecting elements are fins or ribs having, on a plane substantially parallel to air flow along the gap, an elongated shape section, in the radial direction (R-R); and wherein said braking band further comprises at least one of the following features or a combination thereof:
- the connecting elements close to the outer diameter or the outer rank have an elongated drop-shaped section in a radial direction (R-R) on a plane substantially parallel to air flow along the gap;
- at least two of said connecting elements have, on a plane substantially parallel to air flow along the gap, a diamond or rhombus-shaped section with four vertices joined by four sides, said four sides being rectilinear in shape;
- all the ridges are arranged in a circular portion of said gap near said outer diameter;
- all the ridges are arranged in a circular portion of said gap near which the outer rank of connecting elements is present.

6. The braking band of claim 1, wherein
the thickness of at least one plate of said two mutually facing plates between said at least two separate ridge branches is substantially equal to said predetermined plate thickness;
said two mutually facing plates comprise outer surfaces;
said outer surfaces comprise flat and opposite annular portions which form braking surfaces; and
a distance between said inner surfaces and said braking surfaces defines said predetermined plate thickness;
said braking band further comprising at least one of the following features:
said inner surfaces are flat surfaces;
a maximum axial width or axial extension of said gap is reached between said at least one ridge and each adjacent connecting element.

7. The braking band of claim 1, wherein
said at least one ridge and said at least two separate ridge branches have a symmetrical shape with respect to a plane containing the axial direction (X-X) and the radial direction (R-R); and wherein said braking band further comprises at least one of the following features or a combination thereof:
said braking band comprises a band outer edge at said outer diameter;
viewed on a plane comprising the radial direction (R-R) and the circumferential direction (C-C), said at least one ridge and the at least two separate ridge branches form a branched ridge, said branched ridge is V-shaped and forms a concavity facing the band outer edge;
viewed on a plane comprising the radial direction (R-R) and the circumferential direction (C-C), said at least one ridge and the at least two separate ridge branches form a branched ridge, and said branched ridge is crescent-shaped;
said at least one ridge comprises a cylinder-shaped ridge central body from which said at least two separate ridge branches project.

8. A disc brake disc comprising
a braking band according to claim 1.

9. A vehicle comprising
a braking band according to claim 1.

* * * * *